Feb. 8, 1938. F. NEUMANN 2,107,676
AWNING
Filed Aug. 24, 1935
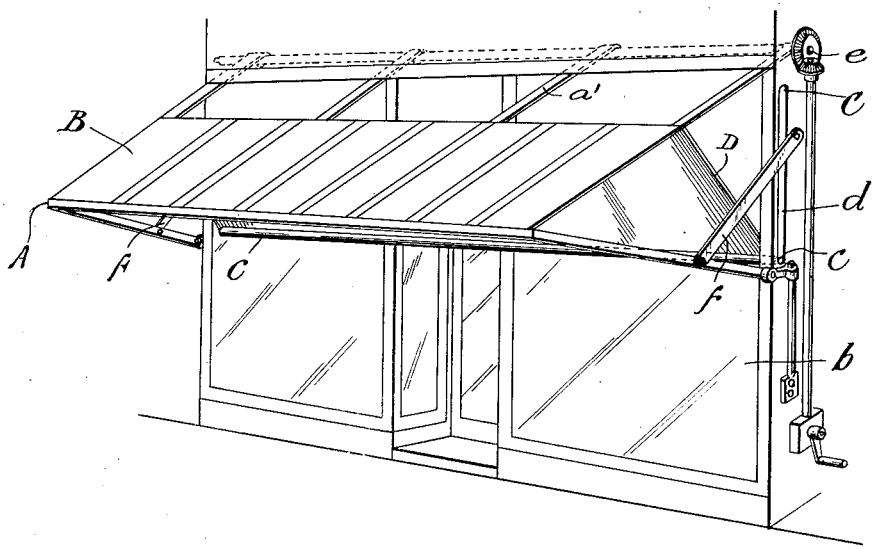
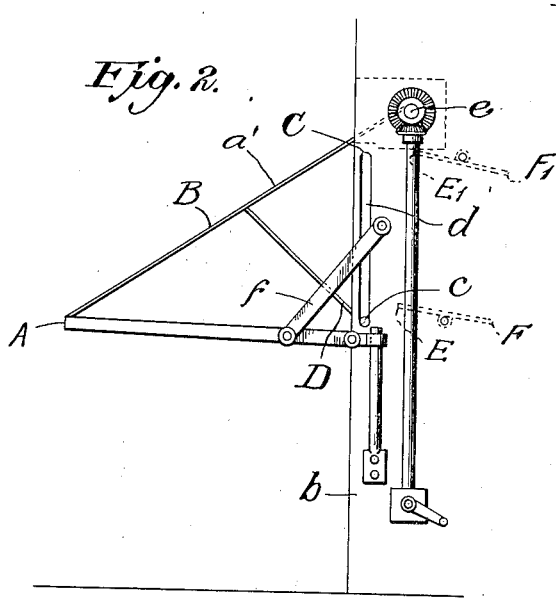
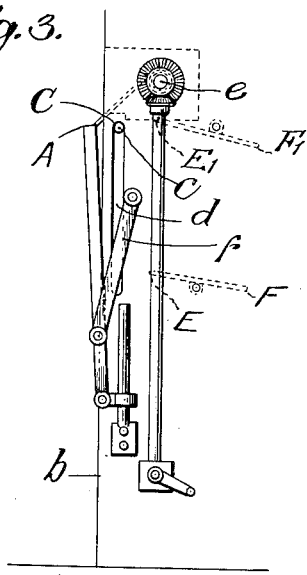
Inventor:
Friedrich Neumann,
Otto Munk
Attorney.

Patented Feb. 8, 1938

2,107,676

UNITED STATES PATENT OFFICE 2,107,676

AWNING

Friedrich Neumann, Berlin, Germany

Application August 24, 1935, Serial No. 37,631
In Germany August 31, 1934

4 Claims. (Cl. 156—44)

This invention relates to awnings and more particularly to awnings for use in connection with store-windows.

My invention has for its general object the construction of an awning by means of which an illumination or brightening-up of the objects displayed in store-windows may be attained. Contrasted with known awnings my novel awning does not prevent the light from entering into the space in the rear of the window, and avoids darkening of this space, whereby any artificial illumination can be dispensed with during daytime.

According to my invention the awning, which is mounted at the usual place above the store-window, comprises one part which is permeable to light and two parts substantially impervious to light and forming a saddle roof, the pervious part being attached to the impervious parts near the common upper edge of the latter. One of said impervious parts extends in a rearward and downward direction from said common edge, while the light pervious part extends in a rearward and upward direction from said common edge. Part of the light entering said light-permeable part thus strikes the rearwardly extending impervious part with the result that this light may be reflected by the latter, owing to a suitable formation of its upper surface, in direction towards the window. The two light-impermeable parts of the awning will thus effect a darkening of the space in front of the lower portion of the window, while above the boundary between one of these two awning-parts and the window an increased amount of light will enter the latter.

One embodiment of my invention is illustratively exemplified in the accompanying drawing in which Fig. 1 is a perspective view of a store-window with the awning mounted thereon. Fig. 2 is a diagrammatical side view, partly in section of Fig. 1 and Fig. 3 is a diagrammatical side view similar to that of Fig. 2, but with the awning in raised position.

In the drawing B, D designate the two light impervious parts of the awning which form a saddle roof. The light pervious parts consists preferably of a plurality of ribbons or straps $a'$ attached to the common edge of the impervious parts serving only to connect the saddle roof to the winding mechanism. These ribbons or strips are not adapted to collect the light, but permit a practically unimpeded passage of light through this part of the awning.

The frame of the awning comprises a horizontal rod $c$ to which the lower edge of the rear impervious part D of the awning is fixed. Vertical guide slots $d$ for the rod $c$ are provided on opposite sides of the window $b$. The awning in its lowered position is supported by the usual frame pivoted at its ends to vertically adjustable brackets and retained in proper position by pivoted links $f$ attached at one end to the frame of the awning and at the other end to the window frame at both sides of the window.

Above the window there is arranged a rotatable shaft $e$. The upper ends of the ribbons $a'$ are fixed to the shaft $e$ and upon rotation of the latter first said ribbons and then the light impervious parts of the awning in a double layer are wound about the shaft $e$.

According to my invention the part D of the awning may be made light reflecting on its upper surface, for instance by giving this surface a light colour, so that it will throw the light striking thereon onto the surface of the window above the point C. By this additional light-effect the brightness of the space in the rear of the window, especially in the rear of its upper part, will be essentially increased. A further increase of the brightness of this space may be attained, as shown in Fig. 2, by providing reflectors or mirrors E—F and E'—F' which serve to throw the reflected light, especially light coming from the upper surface of the light-impermeable part D into the space rearwardly of the window in definite direction or towards definite objects displayed therein. By movably arranging these reflectors or mirrors the guiding of light within the space rearwardly of the window may be adjusted, so that certain parts of this space or certain objects displayed therein may be illuminated quite effectively in various manners.

The mechanical details of the awning frame are well known and do not form part of my present invention.

I claim:

1. An awning, particularly for store windows, comprising a part pervious to light and two parts substantially impervious to light, said two impervious parts being arranged to form substantially a saddle roof, and the pervious part being attached to the impervious parts near their common top edge, and one of said impervious parts extending in a rearward and downward direction from said common edge.

2. An awning as claimed in claim 1 in which said light-pervious part consists of ribbons.

3. An awning as claimed in claim 1 in which said rearwardly and downwardly extending impervious part has a light-reflecting upper surface and being inclined at an angle to reflect the light penetrating through said pervious part into the upper part of the window.

4. An awning particularly for store windows comprising a flexible part pervious to light, two flexible parts substantially impervious to light, said two impervious parts being arranged substantially to form a saddle roof, and the pervious part being attached to the impervious parts at their common top edge, one of said impervious parts extending in a rearward and downward direction, and said pervious part in a rearward and upward direction from said common edge, and means at the top of said pervious part for winding up first said pervious part and then in a double layer said two impervious parts.

FRIEDRICH NEUMANN.